US011709231B2

United States Patent
Yoo et al.

(10) Patent No.: US 11,709,231 B2
(45) Date of Patent: Jul. 25, 2023

(54) REAL TIME GATING AND SIGNAL ROUTING IN LASER AND DETECTOR ARRAYS FOR LIDAR APPLICATION

(71) Applicant: Infineon Technologies AG, Neubiberg (DE)

(72) Inventors: Han Wong Yoo, Vienna (AT); Marcus Edward Hennecke, Graz (AT); Georg Schitter, Vienna (AT); Thomas Thurner, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1106 days.

(21) Appl. No.: 16/265,416

(22) Filed: Feb. 1, 2019

(65) Prior Publication Data

US 2020/0200877 A1    Jun. 25, 2020

Related U.S. Application Data

(60) Provisional application No. 62/783,720, filed on Dec. 21, 2018.

(51) Int. Cl.
*G01S 7/481* (2006.01)
*G01C 9/00* (2006.01)
(Continued)

(52) U.S. Cl.
CPC .............. *G01S 7/4817* (2013.01); *G01C 9/00* (2013.01); *G01S 7/484* (2013.01); *G01S 7/4808* (2013.01); *G01S 7/4863* (2013.01); *G01S 17/931* (2020.01)

(58) Field of Classification Search
None
See application file for complete search history.

(56) References Cited

U.S. PATENT DOCUMENTS 7,969,558 B2   6/2011   Hall
9,606,235 B2   3/2017   Clair et al.
(Continued)

FOREIGN PATENT DOCUMENTS

CN   104792259 A   7/2015
CN   108431583 A   8/2018
JP   2004317134 A * 11/2004

OTHER PUBLICATIONS

Georgehelser, "Advantages of variable vertical FOV LIDAR for autonomous vehicles", Jun. 1, 2018, precisionlaserscanning.com, p. 1-4. (Year: 2018).*

(Continued)

*Primary Examiner* — Yuqing Xiao
*Assistant Examiner* — Benjamin Richard Hebert
(74) *Attorney, Agent, or Firm* — Harrity & Harrity, LLP

(57) ABSTRACT

A Light Detection and Ranging (LIDAR) system integrated in a vehicle includes a LIDAR transmitter configured to transmit laser beams into a field of view, the field of view having a center of projection, and the LIDAR transmitter including a laser to generate the laser beams transmitted into the field of view. The LIDAR system further includes a LIDAR receiver including at least one photodetector configured to receive a reflected light beam and generate electrical signals based on the reflected light beam. The LIDAR system further includes a controller configured to receive feedback information and modify a center of projection of the field of view in a vertical direction based on the feedback information.

24 Claims, 8 Drawing Sheets

(51) Int. Cl.
*G01S 7/4863* (2020.01)
*G01S 7/48* (2006.01)
*G01S 7/484* (2006.01)
*G01S 17/931* (2020.01)

(56) References Cited

U.S. PATENT DOCUMENTS

| | | |
|---|---|---|
| 9,693,029 B1 | 6/2017 | Jackson |
| 2009/0033779 A1* | 2/2009 | Mo .................. H04N 5/378 348/308 |
| 2012/0044476 A1 | 2/2012 | Earhart et al. |
| 2012/0236379 A1* | 9/2012 | da Silva ............. G02B 26/0841 359/200.8 |
| 2014/0297116 A1* | 10/2014 | Anderson .............. H02K 29/08 701/37 |
| 2016/0274589 A1 | 9/2016 | Templeton et al. |
| 2017/0001736 A1* | 1/2017 | Kolb .................. B64G 1/62 |
| 2017/0242108 A1* | 8/2017 | Dussan ................ G01S 7/4868 |
| 2018/0045816 A1 | 2/2018 | Jarosinski et al. |
| 2018/0143308 A1 | 5/2018 | Vlaiko et al. |
| 2018/0156896 A1 | 6/2018 | O'Keeffe |
| 2018/0164439 A1 | 6/2018 | Droz et al. |
| 2018/0188359 A1 | 7/2018 | Droz et al. |
| 2018/0252513 A1* | 9/2018 | Takashima ............ G01S 17/931 |
| 2018/0284234 A1 | 10/2018 | Curatu |
| 2018/0284241 A1 | 10/2018 | Campbell et al. |
| 2018/0284242 A1 | 10/2018 | Campbell |
| 2018/0284246 A1 | 10/2018 | LaChapelle |
| 2018/0284276 A1 | 10/2018 | Campbell |
| 2018/0284284 A1 | 10/2018 | Curatu |
| 2018/0284780 A1 | 10/2018 | McWhirter et al. |
| 2018/0341009 A1* | 11/2018 | Niclass ................ G01S 7/4817 |
| 2019/0011567 A1* | 1/2019 | Pacala .................. G01S 7/4863 |
| 2019/0109977 A1* | 4/2019 | Dutton ................. G01S 7/4863 |
| 2019/0146070 A1* | 5/2019 | Hansson ................ G01S 17/32 356/5.09 |
| 2019/0154889 A1* | 5/2019 | McWhirter ....... H01L 27/14643 |
| 2019/0180502 A1* | 6/2019 | England ................ B60W 10/04 |
| 2019/0227175 A1* | 7/2019 | Steinberg ............... G01S 17/93 |
| 2020/0088859 A1* | 3/2020 | Shepard ................ G01S 7/4811 |
| 2020/0132844 A1* | 4/2020 | Wolf .................... G01S 17/931 |
| 2020/0348402 A1* | 11/2020 | Ye ....................... G01S 7/4815 |

OTHER PUBLICATIONS

Dossay Oryspayev, Ramanathan Sugumaran, John DeGroote and Paul Gray—"LiDAR data reduction using vertex decimation and processing with GPGPU and multicore CPU technology." Computers & Geosciences, Oct. 10, 2011, pp. 118-125.

Rajeev Thakur—"Scanning LIDAR in Advanced Driver Assistance Systems and Beyond." IEEE Consumer Electronics Magazine, Jul. 2016, pp. 48-54.

* cited by examiner

REAL TIME GATING AND SIGNAL ROUTING IN LASER AND DETECTOR ARRAYS FOR LIDAR APPLICATION

CROSS-REFERENCE TO RELATED APPLICATIONS

This application claims the benefit of U.S. 62/783,720 filed on Dec. 21, 2018, which is incorporated by reference as if fully set forth.

FIELD

The present disclosure relates generally to devices and methods for Light Detection and Ranging (LIDAR).

BACKGROUND

Light Detection and Ranging (LIDAR), is a remote sensing method that uses light in the form of a pulsed laser to measure ranges (variable distances) to one or more objects in a field of view. In particular, light is transmitted towards the object. Single photodetectors or arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

Due to a requirement of detecting all possible situations in a field of view, a LIDAR system can include multiple channels of laser and detector pairs and may further include data acquisition and processing for all detector channels. For example, a detector array has multiple channels for receiving light from objects located in different regions of a field of view. Each detector of the detector array may be responsible for receiving light from a different angle. Meanwhile, laser and detector channels are used during a scanning operation and all detector channels are connected to signal processing resources on a one-to-one basis to transmit electrical signals thereto. However, a field of view is typically fixed in a vertical direction, while not all vertical angles in a field view are useful in all situations. This may cause inefficiencies and overhead for entire vehicle control system For example, a road ahead of a vehicle may be of high interest. While this region in the vertical field of view is rather narrow (e.g., less than 10 degrees), a LIDAR system may be required to have a wider vertical field of view (e.g., 25 degrees or more) to handle all situations. In this case, resources are expended to obtain LIDAR data outside a vertical region of interest. This leads to an inefficiency in the use of laser, detector, data acquisition, and data processing resources.

Therefore, an improved LIDAR device that utilizes laser, detector, data acquisition, and data processing resources more efficiently may be desirable.

SUMMARY

Embodiments provide Light Detection and Ranging (LIDAR) systems and methods for operating the same, and, more particularly, to modifying a field of view in a vertical direction based on feedback information.

A LIDAR system integrated in a vehicle includes a LIDAR transmitter configured to transmit laser beams into a field of view, the field of view having a center of projection, and the LIDAR transmitter including a laser to generate the laser beams transmitted into the field of view. The LIDAR system further includes a LIDAR receiver including at least one photodetector configured to receive a reflected light beam and generate electrical signals based on the reflected light beam. The LIDAR system further includes a controller configured to receive feedback information and modify a center of projection of the field of view in a vertical direction based on the feedback information.

A LIDAR system includes a LIDAR transmitter configured to scan a field of view with a plurality of laser beams, the LIDAR transmitter including a laser array including a plurality of laser sources each configured to transmit a different one of a plurality of laser beams such that each of the plurality of laser beams is projected from the LIDAR transmitter into a different vertical region of a plurality of vertical regions. The LIDAR system further includes a controller configured to receive feedback information and modify the field of view in a vertical direction based on the feedback information, and a LIDAR receiver including a photodetector array configured to receive a reflected light beam and generate electrical signals based on the reflected light beam.

A LIDAR system includes a LIDAR transmitter configured to scan a field of view with a vertical scanning line in a horizontal scanning direction. The LIDAR transmitter includes a laser array including a plurality of laser sources each configured to transmit a different one of a plurality of laser beams such that the plurality of laser beams are projected as the vertical scanning line, and a one-dimensional microelectromechanical systems (MEMS) oscillating structure configured to oscillate about a single scanning axis and reflectively transmit the plurality of laser beams such that the vertical scanning line moves horizontally across the field of view in the horizontal scanning direction as the one-dimensional MEMS oscillating structure oscillates about the single scanning axis. The LIDAR system further includes a controller configured to receive feedback information and modify the field of view in a vertical direction perpendicular to the horizontal scanning direction based on the feedback information. The LIDAR system further includes a LIDAR receiver including a photodetector array configured to receive a reflected light beam and generate electrical signals based on the reflected light beam.

A LIDAR scanning method includes transmitting laser beams into a field of view, the field of view having a center of projection; receiving a reflected light beam at at least one photodetector; generating, by the at least one photodetector, electrical signals based on the reflected light beam; receiving feedback information; and modifying a center of projection of the field of view in a vertical direction based on the feedback information.

BRIEF DESCRIPTION OF THE DRAWINGS

Embodiments are described herein making reference to the appended drawings.

DETAILED DESCRIPTION

Figure 1:
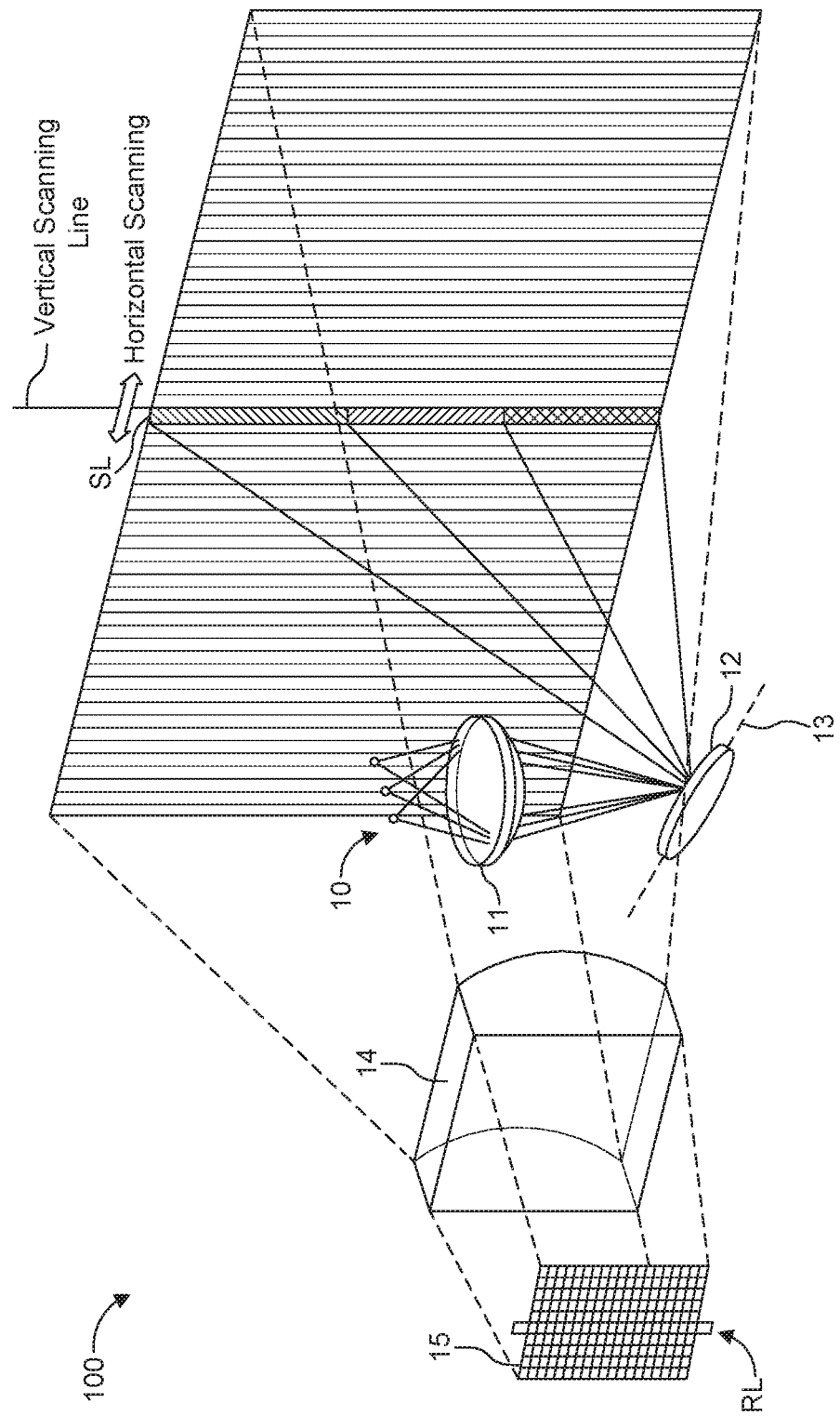
FIG. 1 is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In LIDAR systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Currently, a photodetector array may be used to measure the reflected light. The photodetector array may be a one-dimensional (1D) array that consists of multiple rows of photodetectors arranged in a single column or a two-dimensional (2D) array that consists of multiple rows and columns of photodetectors arranged in a grid-like arrangement. Each pixel row or group of adjacent pixel rows may correspond to a different vertical angle in a field of view.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted until a time the reflected light pulse is received at the receiver (i.e., at the pixel array). The "time-of-flight" of the light pulse is then translated into a distance.

A scan such as an oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used.

FIG. 1 is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) MEMS mirror 12 (1D MEMS scanner), and a receiver, including a primary optics 14, and an optical receiver 15. The optical receiver 15 in the illustration is a 2D photodetector array 15 but may alternatively be a 1D photodetector array. The receiver may further include receiver circuitry, such as data acquisition/readout circuitry and data processing circuitry, as will be further described according to FIG. 2.

The photodetector array 15, whether it be a 2D array or a 1D array, is arranged in such a manner that an intended field of view is mapped vertically on the vertical extension of the photodetector array 15. A received light beam will hit only a specific row or group or rows of the detector array depending on the vertical angle of the transmitted and reflected light beam.

The illumination unit 10 includes three light sources (e.g., laser diodes or light emitting diodes) that are linearly aligned in single bar formation and are configured to transmit light used for scanning the field of view for objects. The light emitted by the light sources is typically infrared light although light with other wavelength might also be used. As can be seen in the embodiment of FIG. 1, the shape of the light emitted by the light sources is spread in a direction perpendicular to the transmission direction to form a light beam with an oblong shape perpendicular to a transmission direction. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form for each emitted laser shot a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple vertical segments, where each vertical segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a transmission direction of the laser beams. As can be seen from FIG. 1, each of the light sources is associated with a different vertical region in the field of view such that each light source illuminates a vertical scanning line only into the vertical region associated with the light source. For example, the first light source illuminates into a first vertical region and the second light sources illuminates into a second vertical region which is different from the first vertical region.

In addition, while three laser sources are shown, it will be appreciated that the number of laser sources are not limited thereto. For example the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Due to this single scanning axis of rotation, the MEMS mirror 12 is referred to as a 1D MEMS mirror or 1D MEMS scanner.

The MEMS mirror 12 is configured to oscillate "side-to-side" about a single scanning axis 13 such that the light reflected from the MEMS mirror 12 (i.e., the vertical scanning line of light) oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate between +/−15 degrees in a horizontal scanning direction to steer the light over +/−30 degrees (i.e., 60 degrees) making up the horizontal scanning range of the field of view. Thus, the field of view may be scanned, line-by-line, by a rotation of the MEMS mirror 12 though its degree of motion. One such sequence though the degree of motion (e.g., from −15 degrees to +15 degrees or vice versa) is referred to as a single scan. Thus, two scans are used for each scanning period. Multiple scans may be used to generate distance and depth maps, as well as 3D images by a processing unit. The horizontal resolution of the depth maps and images depends on the size of the incremental steps in rotation angle of the MEMS mirror 12 taken between scans.

While the transmission mirror is described in the context of a MEMS mirror, it will be appreciated that other 1D mirrors can also be used. In addition, the degree of rotation is not limited to +/−15 degrees, and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis. LIDAR systems using 1D-scanning mirrors can use a more relaxed shot-rate of the illumination unit 10 (i.e., transmitter) compared to 2D-scanning mirrors which use laser points for scanning the field of view which requires more shots for the transmitter to scan a field of view. In addition, LIDAR systems using 1D-scanning mirrors are typically more robust against shock and vibrations when compared to 2D-scanning mirrors and are therefore well suited for automotive applications.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the photodetector array 15 that receives the reflected light as a receiving line RL and is configured to generate electrical measurement signals. The electrical measurement signals may be used for generating a 3D map of the environment and/or other object data based on the reflected light (e.g., via TOF calculations and processing).

The receiving line RL is shown as a vertical column of light that extends along one of the pixel columns in a lengthwise direction of the pixel column. The receiving line has three vertical regions that correspond to the vertical regions of the vertical scanning line SL shown in FIG. 1. As the vertical scanning line SL moves horizontally across the field of view, the vertical column of light RL incident on the 2D photodetector array 15 also moves horizontally across the 2D photodetector array 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL.

In a system that uses a 1D photodetector array instead of a 2D photodetector array, each light beam (i.e., each receiving line RL) is projected onto the column of the detector array.

The photodetector array 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 15 is a two-dimensional (2D) APD array that comprises an array of APD pixels. As noted above, the photodetector array 15 may be a 1D array that includes a single column of photodiodes. The activation of the photodiodes may be synchronized with light pulses emitted by the illumination unit 10.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by one or more receiving photodiodes of the photodetector array 15. Each receiving photodiode emits a short electrical pulse that is read out by the analog readout circuit. Each signal that is read out of the analog readout circuit may be amplified by an electrical signal amplifier.

A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror, an area (i.e., a field of view) can be scanned, a three-dimensional image can be generated, and objects within the area can be detected.

The signal processing chain of the receiver may also include an analog-to-digital converter (ADC) for each photodiode or for a group of photodiodes. The ADC is configured to convert the analog electrical signals from the photodiodes or group of photodiodes into a digital signal that is used for further data processing.

When a pulse of laser energy as a vertical scanning line SL enters the field of view from the surface of MEMS mirror 12, reflective pulses appear when the laser light illuminates an object in the field of view. These reflective pulses arrive at the photodetector array 15 as a vertical column of light that may, for example, have the width of one photodetector pixel and a length that spans vertically at least partially along a pixel column of the photodetector array 15 in a lengthwise direction. That is, all photodetector pixels in a pixel column or a portion of the photodetector pixels of the pixel column may receive the bar of light. For example, in one instance, all light sources of the illumination unit 10 may be used to generate the scanning line SL/receiving line RL. In this case, the receiving line RL may extend along a full pixel column in the lengthwise direction. In another instance, only a subset of the light sources may be used to generate the scanning line SL/receiving line RL. In this case, the receiving line may extend along only a portion of the pixel column in the lengthwise direction.

In some instances, two or more pixel columns may receive light from a same bar of light. For example, two pixel columns may receive light when a portion of the received bar of light impinges on an area between two photodetector pixels. In this case, two pixel columns may be partially illuminated by a single bar of light in the width direction.

On the other hand, if a partial vertical scanning line SL is generated by the illumination unit 10, as described above, then only a partial pixel column of the photodetector array 15 may be illuminated in a lengthwise direction.

The photodetector array 15 is configured to generate measurement signals (electrical signals) used for generating a 3D map of the environment based on the reflected light (e.g., via TOF calculations and processing). For example, as noted above, the photodetector array 15 may be a 2D array of photodiodes or other light detection component capable of detecting and measuring light, and generating electrical signals therefrom.

While not shown, the LIDAR scanning system 100 may also include a digital micromirror device (DMD) and a secondary optics (e.g., a lens, a total internal reflection (TIR) prism, or a beam splitter) that are configured to initially receive the reflected light through the primary optics 14, and redirect the received reflected light towards the photodetector array 15. For example, the DMD would first receive the reflected light pulse from the primary optics, and deflect the received reflected light through the secondary optics (e.g., a lens, a total internal reflection (TIR) prism, or a beam splitter) onto the photodetector array 15. In this case, the photodetector array 15 would still receive a vertical column of light, as described above.

Figure 2:
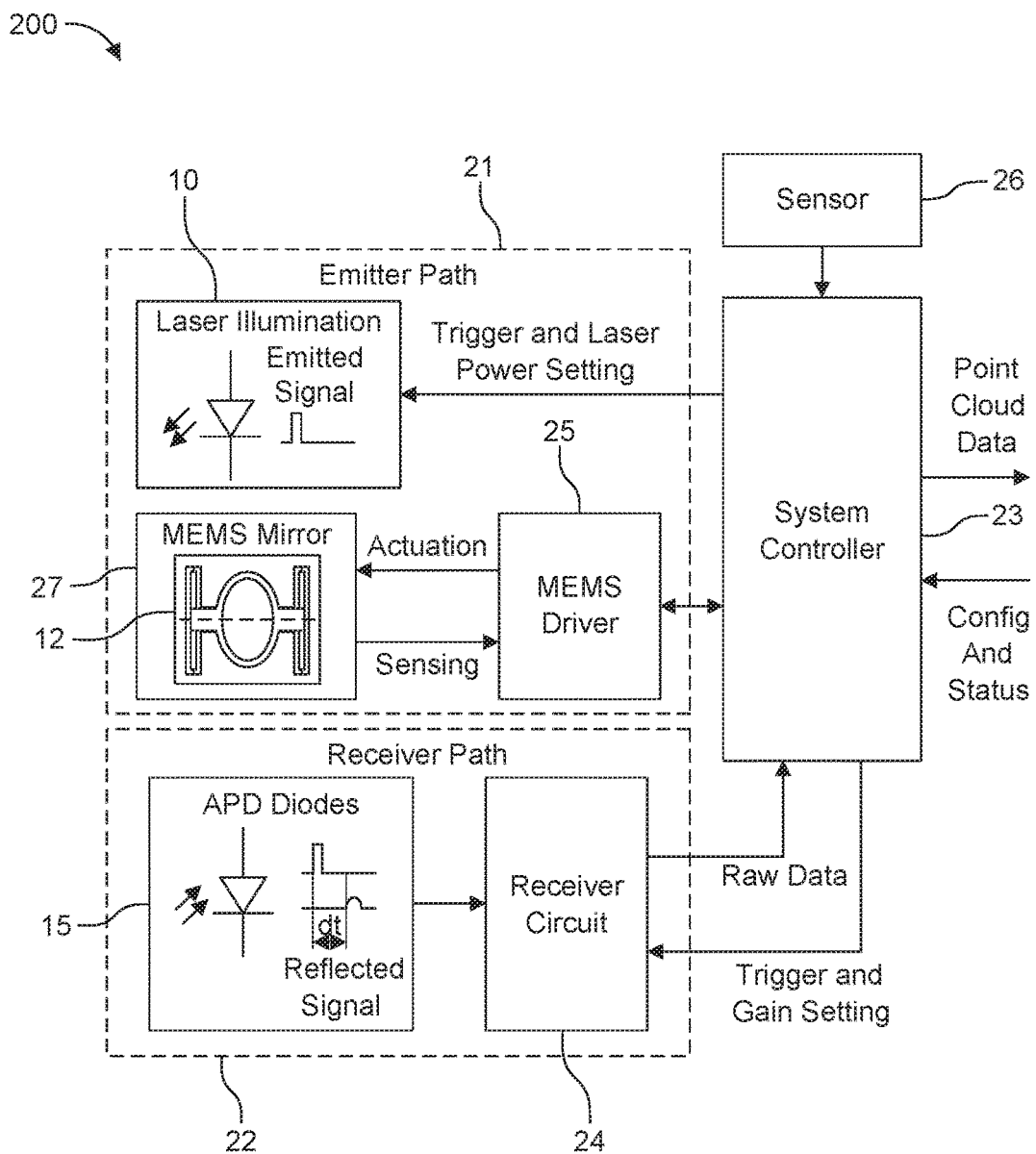
FIG. 2 is a schematic block diagram of a LIDAR scanning system in accordance with one or more embodiments.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry (e.g., comparators, TDCs, ADCs, and digital signal processors (DSPs)) of a signal processing chain for processing data, as well as control circuitry, such as a microcontroller, that is configured to generate control signals. The LIDAR scanning system 200 may also include a tilt sensor 26.

The receiver unit 22 includes the photodetector array 15 as well as a receiver circuit 24. The receiver circuit 24 may include one or more circuitries or sub-circuitries for receiving and/or processing information. The receiver circuit 24 may receive the analog electrical signals from the photodetectors of the photodetector array 15 and transmit the electrical signals as raw analog data or raw digital data to the system controller 23. In order to transmit the raw data as digital data, the receiver circuit 24 may include an analog-to-digital converter (ADC) and a field programmable gate array (FPGA). The receiver circuit 24 may also receive trigger control signals from the system controller 23 that triggers an activation of one or more photodetectors. The receiver circuit 24 may also receive gain setting control signals for controlling the gain of one or more photodetectors.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes are activated to sense, and thus measure, a reflected light signal. Thus, a higher accuracy in position sensing of the MEMS mirror results in a more accurate and precise control of other components of the LIDAR system.

The tilt sensor 26 is configured to measure a tilt angle of a vehicle relative to a first reference direction (e.g., a gravity direction) and provide the tilt angle to the controller 23 as feedback information. For example, the tilt sensor 26 may be an inclinometer or clinometer which is an instrument used for measuring angles of slope (or tilt), elevation, or depression of an object with respect to gravity's direction (e.g., in relation to the geocenter of the Earth). An inclinometer may also be referred to as a gradiometer, tilt indicator, or slope gauge. It will also be appreciated that the first reference direction is not limited to a gravity direction, but may be any reference direction such that a tilt angle can be measured relative thereto.

In addition, feedback information may include a surface angle of an anticipated driving surface of a vehicle relative to a second reference direction. It is to be noted that the first reference direction and the second reference direction may be the same or different direction.

The controller 23 may be configured to determine the surface angle of an anticipated driving surface of the vehicle based on the topography information. For example, at least one processor of the controller 23 may be configured to receive LIDAR data based on the electrical signals from the photodetector 15, generate topography information based on the LIDAR data, and determine the surface angle of the anticipated driving surface relative to the second reference direction based on the topography information.

Alternatively, controller 23 may include a memory device configured to store the topography information in which the topography information is permanently stored or temporarily stored for a predetermined duration after being downloaded. In one example, the topography information may be a topography map stored at the time or manufacturing or may be a topography map downloaded and periodically updated from infrastructure. Topography information may be downloaded according to a region in which the vehicle is located and updated as the vehicle changes locations and moves through different regions.

In this case, at least one processor of the controller 23 may be configured to receive the topography information from memory and location information of the vehicle, and determine the surface angle of the anticipated driving surface relative to the second reference direction based on the topography information and the location information of the vehicle. The location information may be, for example, global positioning system (GPS) data provided by a GPS receiver.

When referring to feedback information used for modifying the field of view in a vertical direction, the feedback information may include the tilt angle of a vehicle relative to a first reference direction, the surface angle of an anticipated driving surface of a vehicle relative to a second reference direction, or a combination thereof.

A frame 27 is provided in which the MEMS mirror 12 is arranged. The MEMS mirror 12 is rotatably fixed to the frame 27 at two pivot points on opposing sides along the scanning axis 13.

Embodiments provided herein are directed to methods to efficiently control the laser array (i.e., the illumination unit 10), the scanner (i.e., the MEMS mirror 12), the detector array 15, and the data acquisition and data processing units in real time based on a vertical region of interest in the field of view. For example, some embodiments are directed to modifying the field of view in a vertical direction perpendicular to the horizontal scanning direction based on feedback information. Other embodiments are directed to scheduling resources in the signal path of the data processing chain based on the region of interest located in the vertical regions.

For example, a first method is directed to controlling a laser array and a photodetector array by selecting a region of interest in the vertical direction. A second method is directed to controlling an actuator of the scanner such that the field of view is modified in the vertical direction based on a region of interest. A third method is directed to controlling data acquisition and processing units provided in different processing paths, in which different signal paths are dynamically activated and deactivated based on a region of interest in the vertical direction. Each method may reduce resources utilized and/or reduce the amount of data acquired or processed. As a result, the amount of data bandwidth required by in the LIDAR system may be reduced and other resources may be freed up. This leads to an efficient operation of the LIDAR system with less laser exposure and the benefits in cost by reducing requirements in the LIDAR design.

Figure 3:
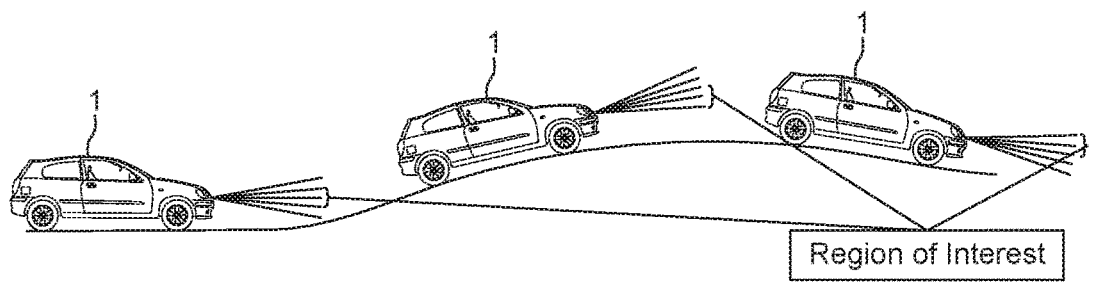
FIG. 3 illustrates an example of a scanning LIDAR system in which a region of interest changes in a vertical direction based on an at least one of a tilt angle of a vehicle and a surface angle of an anticipated driving surface according to one or more embodiments.

FIG. 3 illustrates an example of a scanning LIDAR system in which a region of interest changes in a vertical direction based on an at least one of a tilt angle of a vehicle and a surface angle of an anticipated driving surface according to one or more embodiments. Here, a vehicle 1 is shown at three different angular positions: flat, inclined, and declined. It will be appreciated that the terms "laser channels", "laser sources", and "lasers" may be used interchangeably herein. In this case, all laser channels (i.e., all lasers in the laser array) are used to generate laser beams that are projected into different vertical regions of the field of view.

For example, in the LIDAR system 100 shown in FIG. 1, all laser channels are used to generate the vertical scanning line that is projected into the field of view. Herein, the vertical scanning line defines a vertical dimension of the field of view where each laser channel contributes to a different vertical region of that vertical dimension. In a flash LIDAR system, all laser channels may be used to define the vertical dimension of the field of view, where each laser channel contributes to a different vertical region of that vertical dimension. Thus, all laser channels in the vertical field of view are available to cope with the up and down motion of the vehicle.

However, only a few laser channels may be of interest for obtaining field data. For example, a field of view interest may be about 10 degrees in the vertical direction, while the full available vertical dimension of a full field of view may be about 25 degrees in the vertical direction. Reducing the vertical dimension of the field of view by targeting different regions of interest held to reduce LIDAR data that is to be acquired and processed. Moreover, not only is power saved on the transmitter side by selection which lasers to be activated, but power and processing resources can be saved on the receiver side.

In this example, the vehicle 1 has a LIDAR system with five laser channels (i.e., five laser sources of a laser array) that transmit light beams into the field of view at different vertical angles to define different vertical regions of the vertical dimension of the field of view. For example, each light beam defines a vertical segment of a vertical scanning line in the LIDAR system shown in FIG. 1. The vertical segments of the vertical scanning line each correspond to a different vertical region at which the laser beam is projected. The vertical scanning line is scanned in horizontally to scan the area in the manner described above.

When the vehicle 1 is at a relatively flat angle and/or the anticipated (i.e., upcoming) driving surface is relatively flat, a middle or center region in a field of view may be of interest to detect vehicles and other objects straight ahead. When the vehicle 1 is driven up a hill on an incline, a lower region in the field of view may be of interest to detect vehicles and other objects below the hill. When the vehicle 1 is driven down a hill on a decline, an upper region in the field of view may be of interest to detect vehicles and other objects further ahead towards the bottom of the hill or beyond the hill. Thus, while the LIDAR system requires the full laser array to be available to address a full range of vertical angles (i.e., to address the full vertical dimension of the field of view), only a portion of the laser array may be applicable to a specific driving situation.

Similarly, a full photodetector array corresponds to the full range of vertical angles, while only a portion of the photodetectors of the photodetector array may be applicable to a specific driving situation.

Figure 4A:
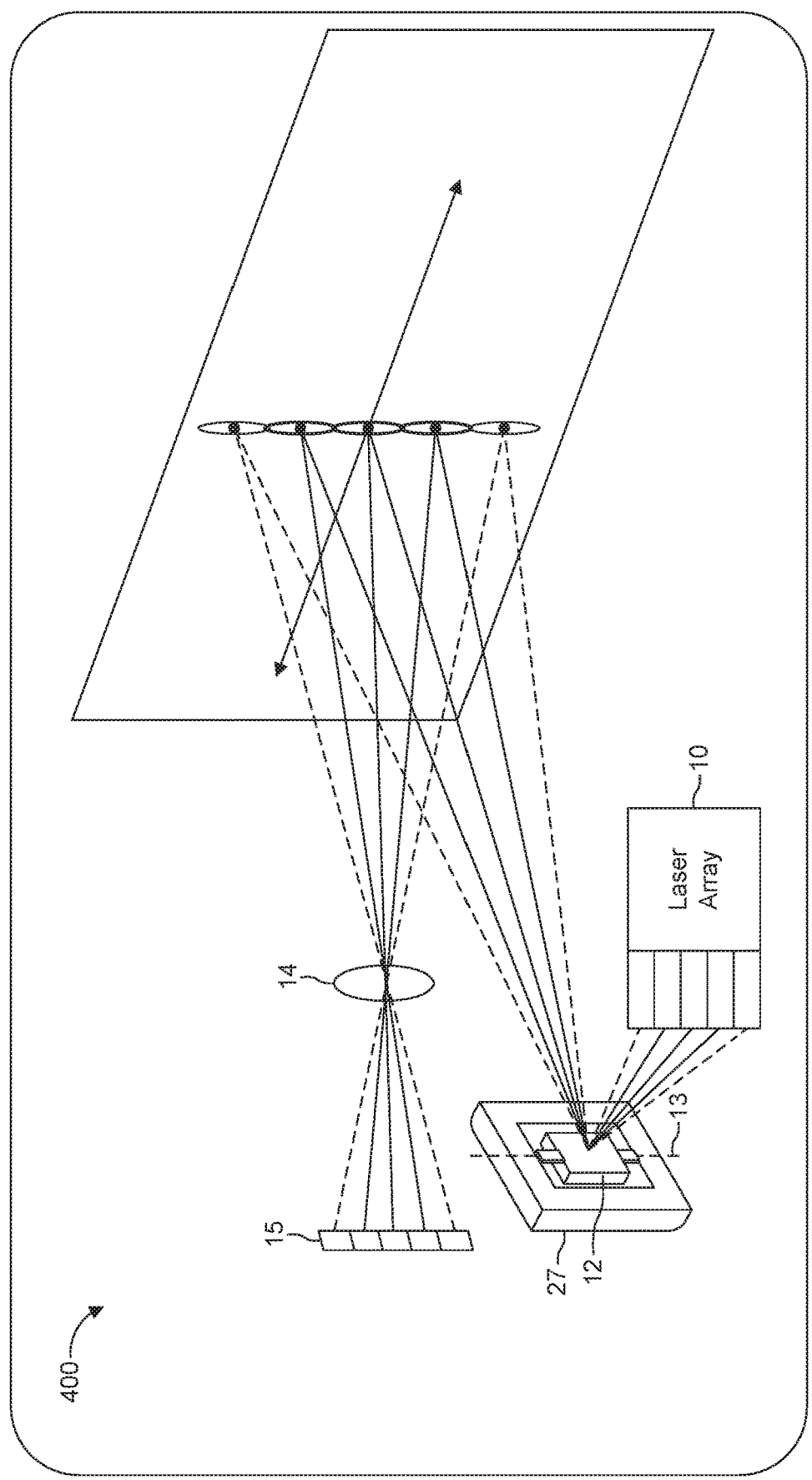
FIGS. 4A-4C show a flexible LIDAR system configured to modify the field of view in a vertical direction perpendicular to a horizontal scanning direction according to one or more embodiments.
Figure 4B:
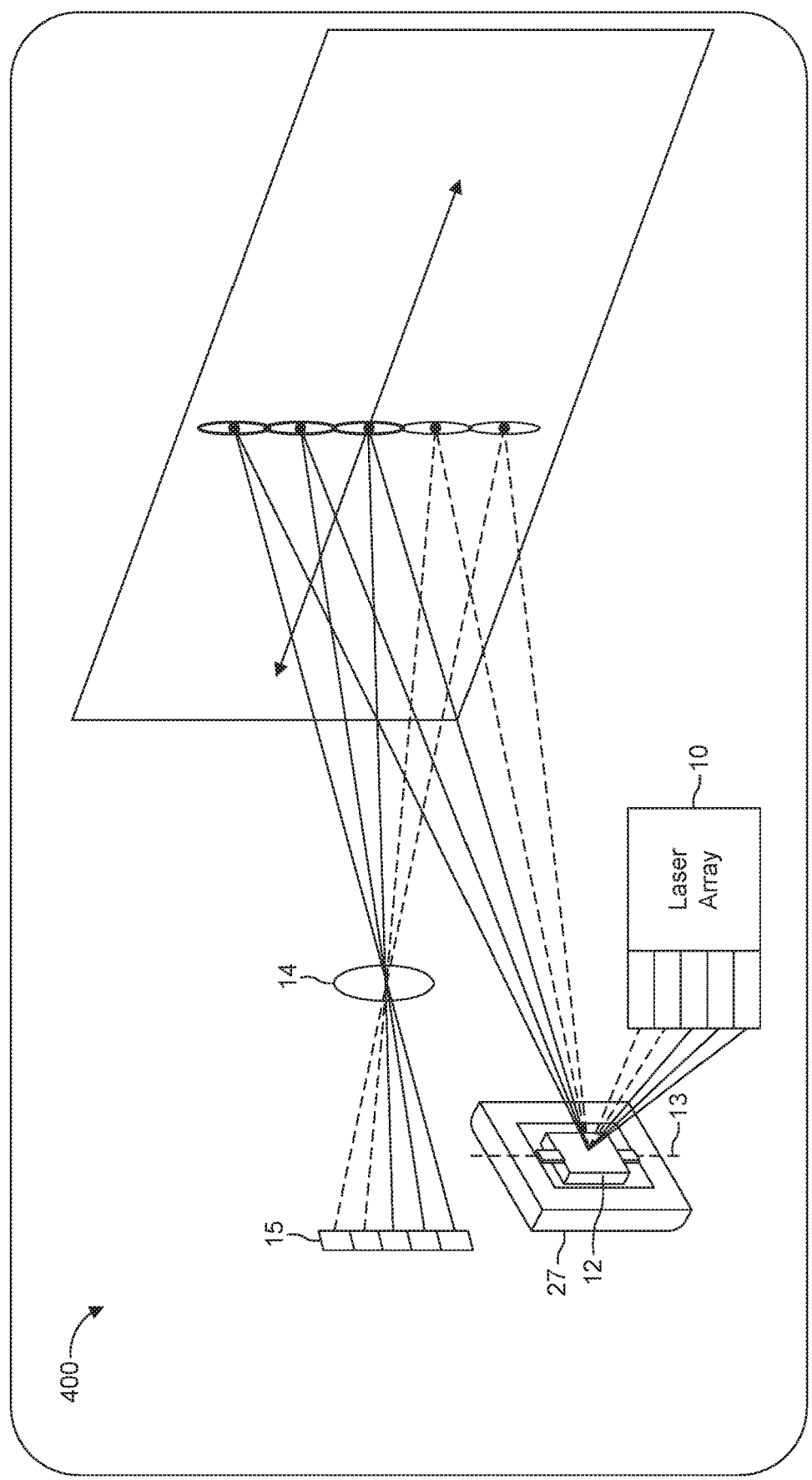
Figure 4C:
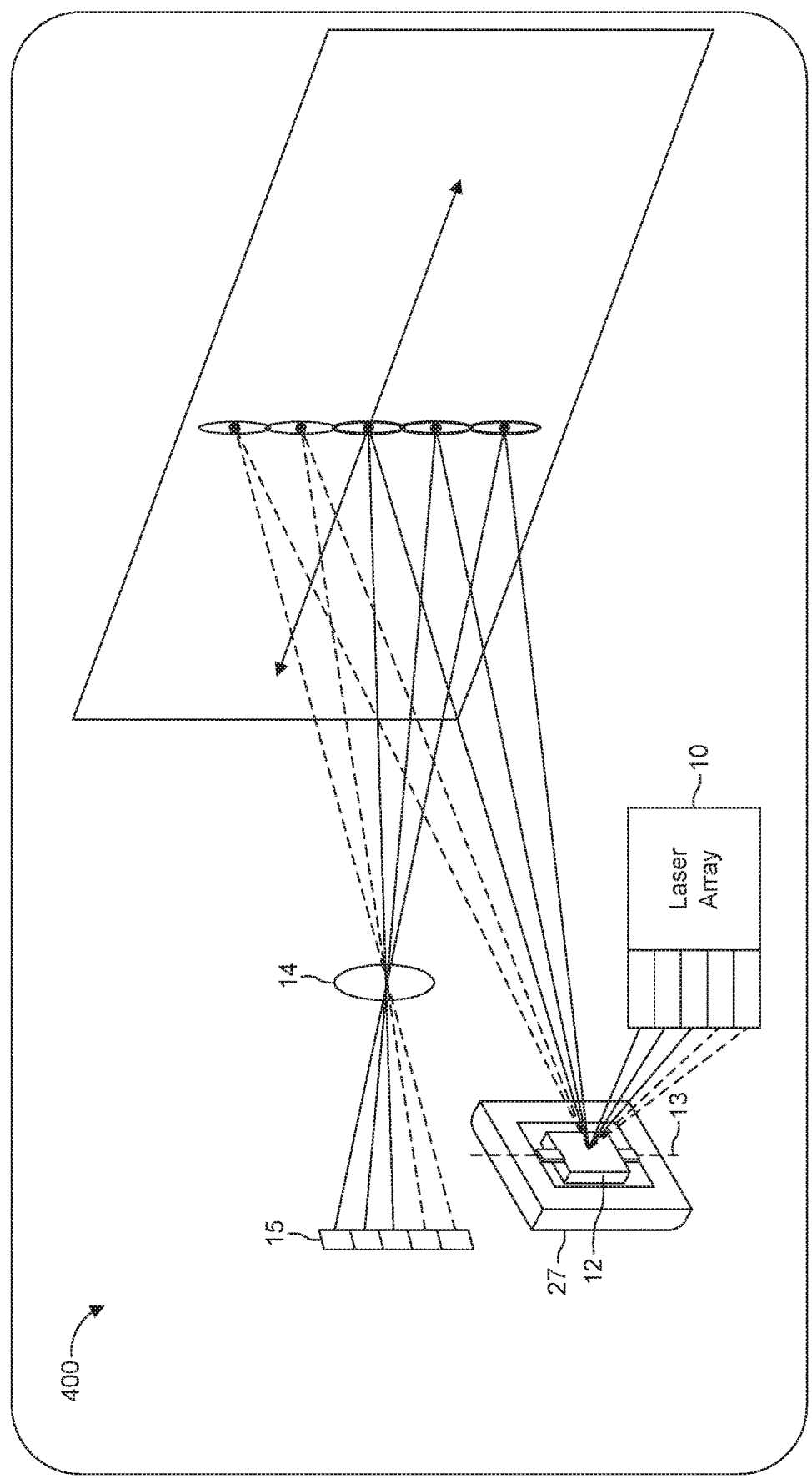

FIGS. 4A-4C show a flexible LIDAR system 400 configured to modify the field of view in a vertical direction perpendicular to a horizontal scanning direction according to one or more embodiments. In particular, the LIDAR system 400 is similar to the LIDAR system shown in FIG. 1, but similar concepts may also be applicable to other types of LIDAR systems, such as flash LIDAR systems in which a laser array is used to project laser beams into different vertical regions. Here, the illumination unit 10 may be referred to as a laser array.

As can be observed in the figures, the field of view represents a scanning plane having a center of projection. The controller 23, which controls the firing of each laser individually (see FIG. 2), may be configured to modify the field of view in the vertical direction in real time by shifting the center of projection of the scanning plane in the vertical direction based on feedback information (i.e., the tilt angle of a vehicle relative to a first reference direction and/or the surface angle of an anticipated driving surface of a vehicle relative to a second reference direction). In particular, the center of projection may be shifted according to which lasers of the laser array 10 are activated and which lasers are deactivated by the controller 23. Since each laser is projected to a different vertical region in the scanning area, different regions of interest can be targeted in the vertical direction by selectively activating and deactivating different portions of the laser array 10 (i.e., by selectively activating and deactivating different laser sources of the laser array 10).

FIGS. 4A-4C illustrate a flexible control of the laser array 10 to cope with a variable region of interest. Portions of the laser array 10 can be turned completely off for a scanning operation or operated at a lower pulse repetition rate compared to other laser channels for a scanning operation. In the latter case, the controller 23 is configured modify the field of view in the vertical direction by decreasing a variable pulse repetition rate of a first portion of the laser sources relative to a variable pulse repetition rate of a second portion of the laser sources based on the feedback information. This technique could be useful to still be able to obtain topography information about the environment (i.e., the driving surface) even if a particular vertical region is of interest. The advantage may be that the amount of data may be reduced overall (compressed sensing) but without completely sacrificing the information in the regions of no interest (RONI).

Thus, some lasers may be fired less frequently than others such that those lasers shooting outside a vertical region of interest fire less frequently than the lasers firing towards the vertical region of interest. Modulating the lasers in this manner may modify the field of view in the vertical direction for at least a portion of a scanning period. Thus, a length of a scanning area in the vertical direction may be shortened or narrowed during at least a portion of a scanning period. For example, the length of the vertical scanning line may be shortened in the vertical dimension for at least a portion of a scanning period.

FIG. 4A demonstrates a situation in which the middle three laser sources of the laser array 10 are activated or operated at a higher sampling rate, while the top and the bottom laser sources are deactivated or operated at a lower sampling rate for a scanning operation. As a result, the field of view in the vertical dimension is shortened or narrowed to focus on a center region of the scanning area. In this case, the center of projection of the field of view remains the same as if all laser sources were fully activated.

FIG. 4B demonstrates a situation in which the bottom three laser sources of the laser array 10 are activated or operated at a higher sampling rate, while the top two laser sources are deactivated or operated at a lower sampling rate for a scanning operation. As a result, the field of view in the vertical dimension is shortened or narrowed to focus on an upper region of the scanning area. In this case, the center of projection of the field of view is shifted upward from center in the vertical direction.

FIG. 4C demonstrates a situation in which the top three laser sources of the laser array 10 are activated or operated at a higher sampling rate, while the bottom two laser sources are deactivated or operated at a lower sampling rate for a scanning operation. As a result, the field of view in the vertical dimension is shortened or narrowed to focus on a lower region of the scanning area. In this case, the center of projection of the field of view is shifted downward from center in the vertical direction.

When considering the LIDAR system 100 shown in FIG. 1, the vertical scanning line includes a plurality of vertical segments, each of which correspond to a different vertical region of the scanning area. Furthermore, each of the laser sources contributes to a different segment of the plurality of vertical segments of the vertical scanning line. In this case, the controller 23 is configured modify the field of view in the vertical direction by activating a first portion of the laser sources and deactivating a second portion of the laser sources based on the feedback information in order to shorten a length of the vertical scanning line in the vertical direction. By shifting focus to different regions of interest in a narrower vertical band, the field of view is modified in the vertical direction.

It will be appreciated that activation/deactivation schemes are possible and that different groupings of the laser sources may be utilized to achieve different shifting of the field of view in the vertical direction and is not limited to the groupings illustrated in FIGS. 4A-4C. In each case, photodetectors of the detector array 15 may be paired with a corresponding laser source of the laser array 10. The photodetectors may be selectively activated/deactivated in synchronization with their corresponding laser source. By doing so, the amount of sensor data acquired and provided to the signal processing chain of the LIDAR system may be reduced.

In addition, the tilt sensor 26 is configured to measure a tilt angle of a vehicle relative to a first reference direction, and the feedback information includes the tilt angle of the vehicle. The vertical regions in the scanning area includes a lower region, a center region, and an upper region that are activated and deactivated according to corresponding ones of the of laser sources. Thus, the controller 23 is configured to activate at least the lower region and deactivate the upper region on a condition that the tilt angle corresponds to an incline angle that exceeds a first threshold, activate at least the upper region and deactivate the lower region on a condition that the tilt angle corresponds to decline angle that exceeds a second threshold, and activate at least the center region and deactivate at least part of the lower region and at least part of the upper region on a condition that the tilt angle is between the first threshold and the second threshold.

Additionally or alternatively, the feedback information includes a surface angle of an anticipated driving surface relative to a second reference direction, and the controller 23 is configured to activate at least the lower region and deactivate the upper region on a condition that the surface angle corresponds to an incline angle that exceeds a third threshold, activate at least the upper region and deactivate the lower region on a condition that the surface angle corresponds to decline angle that exceeds a fourth threshold, and activate at least the center region and deactivate at least part of the lower region and at least part of the upper region on a condition that the surface angle is between the third threshold and the fourth threshold. Here, the first and the third threshold may be the same or different, and the second and the fourth threshold may be the same or different.

The controller 23 may use the tilt angle and the surface angle separately or in combination for modifying the field of view in the vertical direction. It will be appreciated that the field of view may be modified in the vertical direction continuously and on a dynamic, real-time basis according to the feedback information. Thus, the order of progression of activating and deactivating certain laser sources or groups of adjacent laser sources may be sequential in the vertical direction or a discontinuity in the progression in the vertical direction may exist. For example, an activation may progress from a lower group to a center group to an upper group of light sources, or vice versa. Alternatively, an activation may progress from a lower group to an upper group, or vice versa, and skip a middle group in the event of a sudden shift in tilt angle and/or surface angle.

Figure 5:
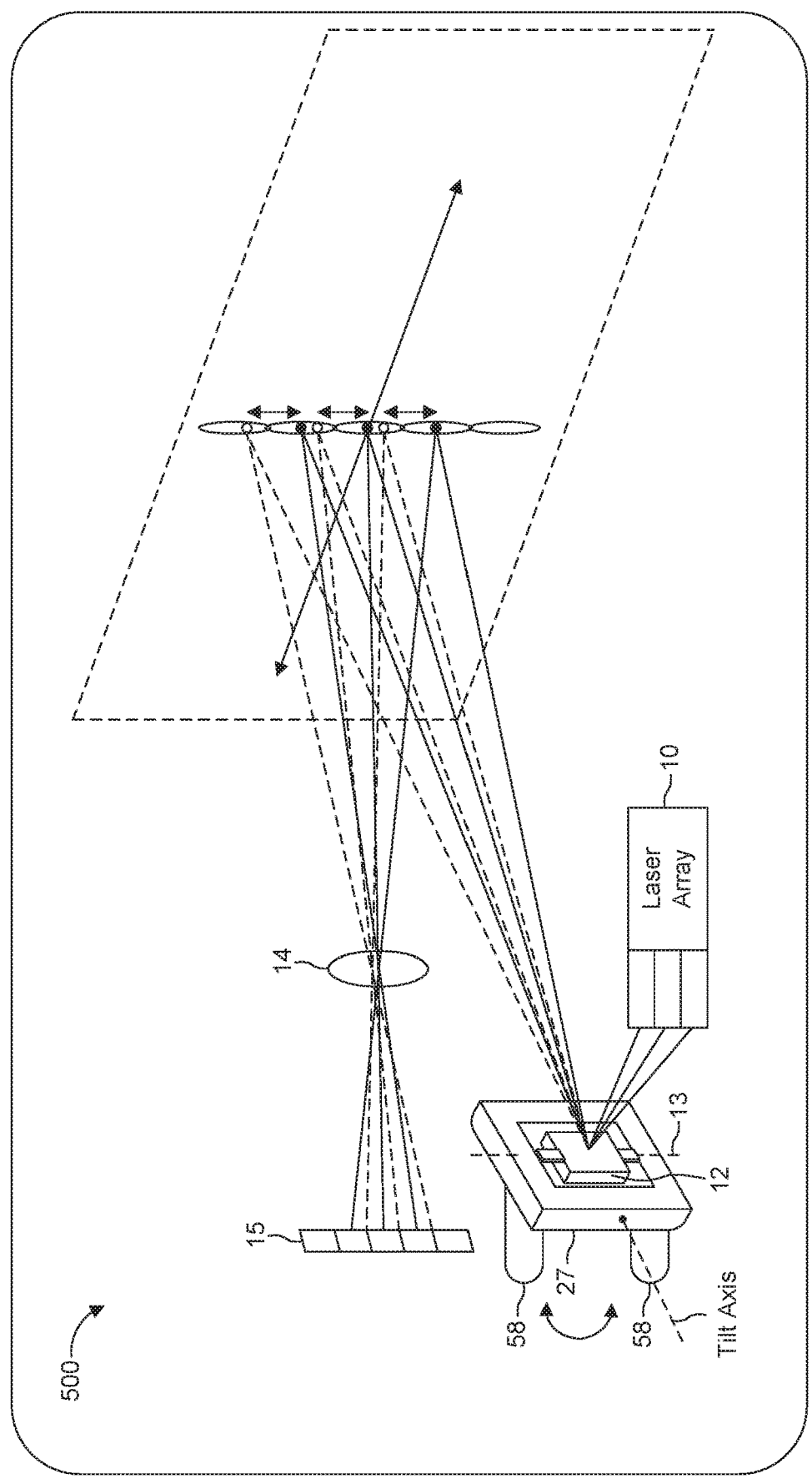
FIG. 5 shows another a flexible LIDAR system configured to modify the field of view in a vertical direction perpendicular to a horizontal scanning direction according to one or more embodiments.

FIG. 5 shows a flexible LIDAR system 500 configured to modify the field of view in a vertical direction perpendicular to a horizontal scanning direction according to one or more embodiments. The LIDAR system 500 is similar to the LIDAR system 400 shown in FIGS. 4A-4C, with the exception that an actuator 58 is coupled to the frame 27 in which the MEMS mirror 12 is arranged.

The actuator 58 is configured to rotate the frame 27, and more specifically, the MEMS mirror 12, about a tilt axis that extends perpendicular to the single scanning axis 13, where an orientation of the MEMS mirror 12 about the tilt axis defines a vertical position of the center of projection of the field of view. The controller 23 is configured to control the actuator 58 to thereby control the vertical angle at which the laser beams are projected from the LIDAR system 500. In this way, an entire portion of the field of view is shifted according to the orientation of the MEMS mirror 12 about the tilt axis. As a result, the controller 23 modifies the field of view in the vertical direction (i.e., up or down) in real time based on the feedback information by modifying the orientation of the MEMS mirror 12 about the tilt axis to shift the center of projection of the scanning plane in the vertical direction.

The tilt sensor 26 is configured to measure the tilt angle of a vehicle relative to a first reference direction, and the feedback information includes the tilt angle of the vehicle. The controller 23 is configured to modify the orientation of the MEMS mirror 12 about the tilt axis via the actuator 58 to shift the center of projection towards a lower vertical region on a condition that the tilt angle corresponds to an incline angle that exceeds a first threshold, modify the orientation of the MEMS mirror 12 about the tilt axis via the actuator 58 to shift the center of projection towards an upper vertical region on a condition that the tilt angle corresponds to a decline angle that exceeds a second threshold, and modify the orientation of the MEMS mirror 12 about the tilt axis via the actuator 58 to shift the center of projection towards a center vertical region on a condition that the tilt angle is between the first threshold and the second threshold.

Additionally or alternatively, the feedback information includes a surface angle of an anticipated driving surface relative to a second reference direction, and the controller 23 is configured to modify the orientation of the MEMS mirror 12 about the tilt axis via the actuator 58 to shift the center of projection towards a lower vertical region on a condition that the surface angle corresponds to an incline angle that exceeds a third threshold, modify the orientation of the MEMS mirror 12 about the tilt axis via the actuator 58 to shift the center of projection towards an upper vertical region on a condition that the surface angle corresponds to a decline angle that exceeds a fourth threshold, and modify the orientation of the MEMS mirror 12 about the tilt axis via the actuator 58 to shift the center of projection towards a center vertical region on a condition that the surface angle is between the third threshold and the fourth threshold. Here, the first and the third threshold may be the same or different, and the second and the fourth threshold may be the same or different.

The controller 23 may use the tilt angle and the surface angle separately or in combination for modifying the field of view in the vertical direction. It will be appreciated that the tilt angle of the mirror be modified continuously and on a dynamic, real-time basis according to the feedback information. Thus, the tilt angle of the mirror may vary continuously through a range of tilt angles as the feedback information changes.

Alternatively, instead of tilting only the MEMS mirror 12 about the tilt axis, it is possible to tilt the entire transmitter (e.g., transmitter unit 21), including the laser array 10, the transmitter optics 11, and the MEMS mirror 12, about a tilt axis by applying a similar principle.

It is further noted that the laser array 10, as shown in FIG. 5, may include a fewer number of laser sources compared to the laser array shown in FIGS. 4A-4C, but may also include the same or greater number of laser sources compared to the laser array shown in FIGS. 4A-4C. However, a fewer number of laser sources (i.e., a fewer number of channels) may permit a narrower region of interest to be targeted as the field of view is modified in the vertical direction.

In addition, the detector channel (i.e., the number of photodetectors in a column) is greater than the laser beam channel (i.e., the number of laser sources) and is controlled electrically. The reflected light may be projected onto different regions of the photodetector array 15 as the orientation of the transmitter about the tilt axis is changed. For example, the reflected light may be shifted up or down along a column of the photodetector array 15 as the field of view is modified in the vertical direction such that different photodetectors in the column receive the reflected light. Thus, the photodetector array 15 receives the reflected signal based on the situation and vertical angle of the MEMS mirror 12.

This scheme may reduce the amount of sensor data acquired by the photodetector array 15 and provided to the signal processing chain of the LIDAR system. This scheme may also be combined with the scheme described in reference to FIGS. 4A-4C such that further discrete vertical regions of interest are targeted.

In addition, the primary optics 14 or the LIDAR receiver 22 itself, including the primary optics 14 and the photodetector array 15, may be configured to tilt about a tilt axis so as to receive reflected light from a vertical region of interest. Thus, the controller 23 may be configured to dynamically modify the orientation of the primary optics 14 or the LIDAR receiver 22 about the tilt axis via an actuator (not illustrated), where a different tilt angle is selected based on the feedback information.

Figure 6:
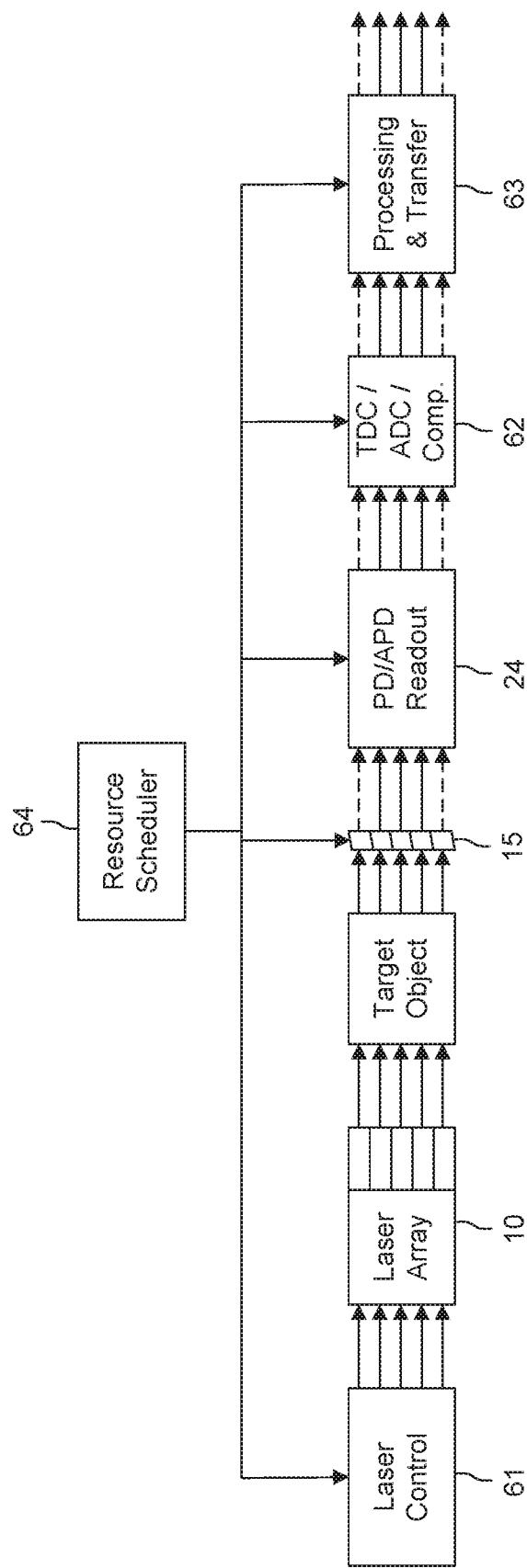
FIG. 6 is a signal perspective view of a LIDAR system according to one or more embodiments.

FIG. 6 is a signal perspective view of a LIDAR system 600 according to one or more embodiments. The LIDAR system 600 may be implemented in any one of the embodiments described herein. The LIDAR system 600 includes a laser array 10 that includes a plurality of laser channels (i.e., laser sources), a photodetector array 15 that includes a plurality of detector channels (i.e., photodetectors), and a receiver circuit 24, as previously discussed. In the direct detection TOF LIDAR case, a laser control unit 61 generates a pulse with a given timing and flashes the laser array 10. The transmitted light is reflected by a target object via backscattering and the reflected light is detected by detector array 15 and converted into electrical signals by readout. By readout, data acquisition and processing units process the signal into point cloud data and transfer the point cloud data to one or more vehicle control units such as automated driver assistance systems (ADAS).

The receiver circuit 24 has a plurality of input signal channels each configured to receive electrical signals from a corresponding one of the detector channels. The receiver circuit 24 also has a plurality of output signal channels or analog readout channels each configured to readout out analog sensor data and provide the analog sensor data to other signal processing components further downstream in the signal processing chain. In other words, the receiver circuit 24 is configured to acquire the electrical signals from the photodetector array 15, and forward the electrical signals as analog sensor data to other signal processing components.

The LIDAR system 600 includes further control, acquisition, and processing components that may be incorporated in the controller 23. In particular, the LIDAR system 600 may include a laser control unit 61, a TDC/ADC/comparator unit 62, a processing and transfer unit 63, and a resource schedule 64.

The laser control unit 61 is configured to trigger the firing of the lasers of the laser array 10.

TDC/ADC/comparator unit 62 is configured to digitize the analog signals from the receiver circuit 24, generate time-of-flight information, and output the digital signals and the time-of-flight information via a plurality of signal channels.

The processing and transfer unit 63 is configured to receive the digital signals and the time-of-flight information via the plurality of signal channels, generate point cloud data and other LIDAR data, and output the LIDAR data to one or more vehicle control units via a plurality of signal channels. Furthermore, the processing and transfer unit 63 may use the point cloud data as topography information, as discussed above, and which may be used by the controller 23 to modify the field of view in the vertical direction.

The resource scheduler 64 is configured to schedule the detector signals of the detector 15 to the data acquisition and data processing units 24, 62, and 63. Specifically, the resource scheduler 64 is configured to select a subset of the laser beam channels and/or a subset of detector channels to be activated, while the remaining, unselected channels are deactivated. Each detector channel may include a photodetector, a row of photodetector, or a group of adjacent rows photodetectors of the detector 15. Thus, the deactivation of a detector channel may include a deactivation of a corresponding photodetector, row of photodetectors, or group of adjacent rows of photodetectors. The number of detector channels may be greater than the number of laser beam channels, and may be controlled electrically based on the region of interest determined by the controller 23 based on the feedback information. In addition, the resource scheduler 64 may dynamically relocate which detector channels are connected to the receiver circuit 24 (i.e., to the readout circuit) and thereby to the readout channels in real time based on the feedback information.

These decisions by the resource scheduler 64 may be based on a region of interest targeted as the field of view is modified in the vertical direction based on the feedback information. In particular, the resource scheduler 64 relocates and reroutes the electrical signals from the detector channels based on whether the signals correspond to a region of interest or not such that the data acquisition and data processing units 24, 62, and 63 may only process those signals that correspond to the region of interest.

Accordingly, the signal processing chain includes a plurality of processing channels that are configured to processes the electrical signals, and the resource scheduler 64 is configured to activate a first portion of the plurality of processing channels and deactivate a second portion of the plurality of processing channels relative to a position of the center of projection of the field of view in the vertical direction, which defines the region of interest. In this way, the resource scheduler 64 directly controls the signal paths from the detector, the data acquisition units, and the data processing units. The resource scheduler 64 decides which subset of the signals is delivered to the next stage.

For example, if a vehicle is driving on flat driving region, then the detector signals at the center regions may be delivered to the data acquisition (DAQ) unit (i.e., the receiver circuit 24), while the detector signals corresponding to the uppermost and lowermost regions are interrupted from being be delivered to the DAQ unit. When the vehicle is driving uphill, detector signals at the lower regions and possibly some center regions may be delivered to the DAQ, while the detector signals corresponding to the upper regions and possibly some center regions are interrupted from being be delivered to the DAQ unit. When the vehicle is driving downhill, detector signals at the upper regions and possibly some center regions may be delivered to the DAQ, while the detector signals corresponding to the lower regions and possibly some center regions are interrupted from being be delivered to the DAQ unit.

This increases the utilization and flexibility of the data acquisition and processing channels and may increase the data acquisition and processing capacity for large detector signals. This may also decrease the amount of processing circuitry and processing bandwidth required to process and generate LIDAR data. For further flexibility, the scheduler 64 may control the signal channels between each entity separately so that the signal processing chain is entirely customizable. The scheduler 64 is also configured to coordinate the allocation of resources at the receiving in conjunction with transmitter side (i.e., in conjunction with the modification of the field of view in the vertical direction by the transmitter). For example, the activation and deactivation of specific laser channels, detector channels, and signal processing channels may be synchronized or coordinated in any number of combinations. The activation and deactivation of specific elements may also be coordinated with the tilt angle of the MEMS mirror 12 or the LIDAR transmitter. Thus, the principles described in conjunction with FIG. 6 may be combined with any of the embodiments disclosed herein.

Figure 7:
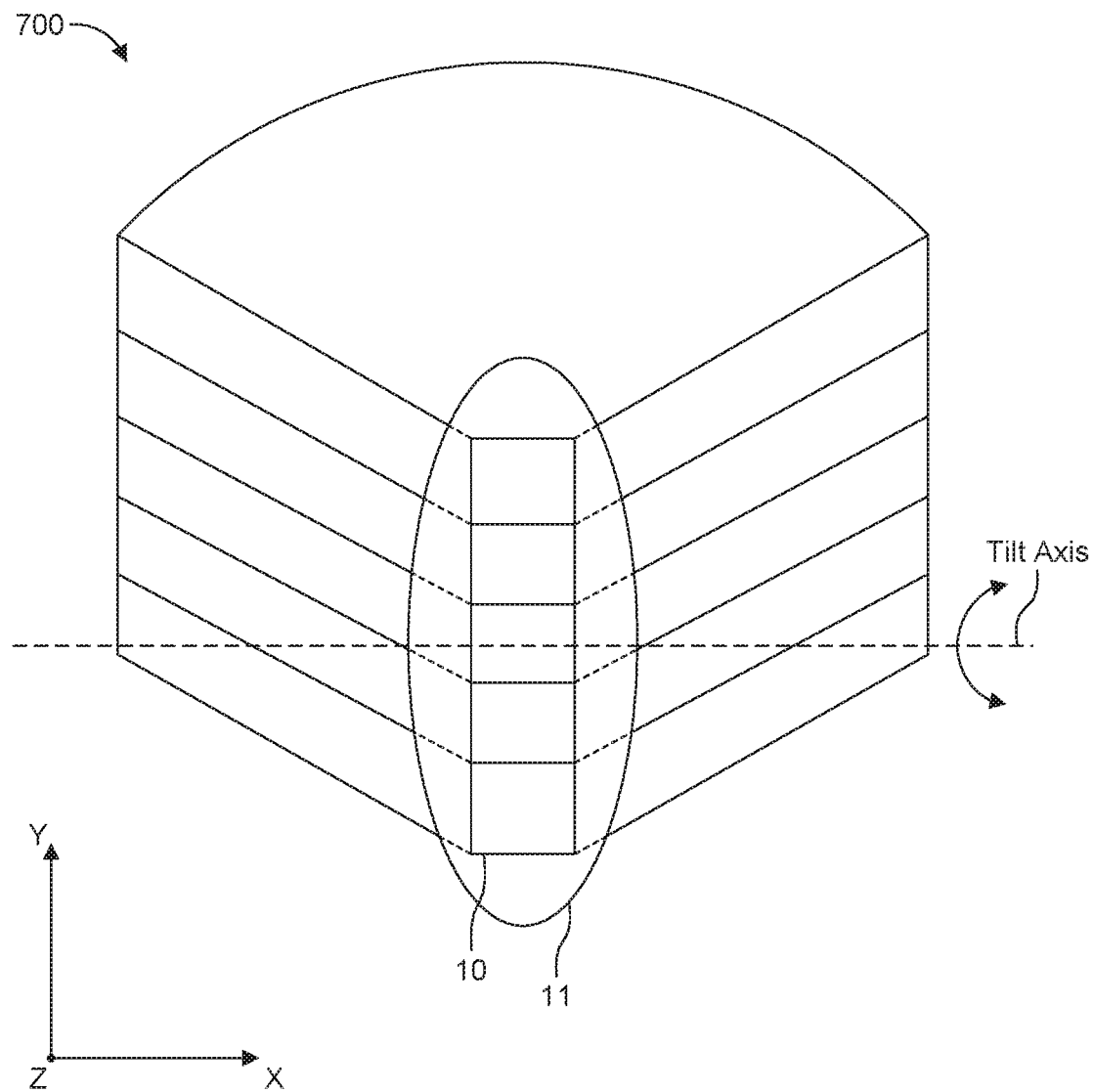
FIG. 7 shows a perspective view of a LIDAR transmitter implemented in a flash LIDAR system according to one or more embodiment.

FIG. 7 shows a perspective view of a LIDAR transmitter 700 implemented in a flash LIDAR system according to one or more embodiment. The LIDAR transmitter 700 includes a laser array 10 and transmitter optics 11. The laser array 10 includes laser sources arranged in a vertical column. The transmitter optics 11 is a diffuser lens configured to receive laser beams from each laser source and transmit wide horizonal and narrow vertical beam. In particular, the laser sources of the laser array 10 may be vertically aligned with one another behind a diffuser lens 11. Each emitted light signal from a laser source of the laser array is transmitted through a diffuser lens to form a wide horizontal and narrow vertical beam. Thus, each laser source projects a laser beam into a different vertical region in the field of view. Objects reflect part of the transmitted light back to the receiver. This light is captured by a receiver lens and redirected to a photodetector array, as similarly described in reference to FIG. 1. Thus, each of the photodetector's pixels captures a distinct segment of the returned light signal. The returned signals are digitized and processed by the signal processing chain.

Different vertical regions for scanning may be selected by a controller (e.g., controller 23) based on selectively activating different ones of the laser sources based on feedback information by applying similar principles described above in reference to FIGS. 4A-4C. For example, laser sources that project laser beams into an upper region of the field of view may be activated during a scanning operation while laser sources that project laser beams into a lower region of the field of view may be deactivated during the scanning operation, and vice versa. In addition, laser sources that project laser beams into a center region of the field of view may be activated while laser sources that project into at least a portion of the upper region of the field of view may deactivated and while laser sources that project into at least a portion of the lower region of the field of view may deactivated. Thus, the controller 23 may modify the field of view in a vertical direction based on the feedback information by activating and deactivating different portions of the laser array that correspond to different vertical regions of interest.

Furthermore, the transmitter 700 may be coupled to an actuator much like the transmitter described in FIG. 5. The actuator may be configured to rotate the entire transmitter 700, including the laser array 10, and the transmitter optics 11 about a tilt axis that extends perpendicular to the vertical direction, where an orientation of the transmitter 700 about the tilt axis defines a vertical position of the center of projection of the field of view. The controller 23 is configured to control the actuator to thereby control the vertical angle at which the laser beams are projected from the transmitter 700. In this way, an entire portion of the field of view is shifted according to the orientation of the transmitter about the tilt axis. As a result, the controller 23 modifies the field of view in the vertical direction (i.e., up or down) in real time based on the feedback information by modifying the transmitter about the tilt axis to shift the center of projection of the scanning plane in the vertical direction. This scheme may also be used in the alternative to or in combination with selectively activating different ones of the laser sources based on feedback information.

In addition, the primary optics 14 or the LIDAR receiver 22 itself, including the primary optics 14 and the photodetector array 15, may be configured to tilt about a tilt axis so as to receive reflected light from a vertical region of interest. Thus, the controller 23 may be configured to dynamically modify the orientation of the primary optics 14 or the LIDAR receiver 22 about the tilt axis via an actuator (not illustrated), where a different tilt angle is selected based on the feedback information.

Although embodiments described herein relate to a MEMS device with a mirror, it is to be understood that other implementations may include optical devices other than MEMS mirror devices. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A Light Detection and Ranging (LIDAR) system integrated in a vehicle, the LIDAR system comprising:
a LIDAR transmitter configured to transmit a plurality of scanning laser beams into a region of interest of a field of view, wherein the field of view is defined by a first vertical dimension and a first horizontal dimension, wherein the field of view comprises a plurality of vertical regions arranged to define the first vertical dimension, wherein the region of interest is defined by a second vertical dimension, a second horizontal dimension, and a center of projection provided at a center of the second vertical dimension and the second horizontal, wherein the second vertical dimension is smaller than the first vertical dimension, wherein the region of interest comprises a portion of the plurality of vertical regions that defines the second vertical dimension, and wherein each scanning laser beam of the plurality of scanning laser beams has a vertical length that extends vertically in the field of view and is equal to the second vertical dimension;
a LIDAR receiver configured to receive a reflected light beam, the LIDAR receiver comprising a plurality of photodetectors arranged in a plurality of rows, wherein each row corresponds to a different vertical region of the field of view, and wherein the plurality of photodetectors is configured to generate electrical signals based on received light; and
a controller configured to receive feedback information and modify the center of projection of the region of interest in a vertical direction based on the feedback information such that a vertical position of the center of projection is shifted vertically within the first vertical dimension of the field of view and the portion of the plurality of vertical regions that corresponds to the region of interest changes,
wherein the LIDAR receiver further comprises:
a plurality of detector channels coupled to the plurality of photodetectors for receiving the electrical signals, wherein each detector channel of the plurality of detector channels corresponds to one of the plurality of vertical regions of the field of view;
a signal processing chain configured to process the electrical signals received from the plurality of detector channels, the signal processing chain comprising a plurality of processing channels that each include at least one signal processing component; and
a readout circuit coupled to and between the plurality of detector channels and the plurality of processing channels,
wherein, based on the vertical position of the center of projection, the readout circuit is configured to selectively couple a first subset of detector channels of the plurality of detector channels that correspond to the portion of the plurality of vertical regions to the plurality of processing channels and selectively decouple a second subset of detector channels of the plurality of detector channels that do not correspond to the portion of the plurality of vertical regions, and
wherein the controller is configured to dynamically change the first subset of detector channels and the second subset of detector channels as the portion of the plurality of vertical regions that correspond to the region of interest changes.

2. The LIDAR system of claim 1, wherein the feedback information includes a tilt angle of the vehicle relative to a first reference direction and a surface angle of an anticipated driving surface relative to a second reference direction.

3. The LIDAR system of claim 2, further comprising:
a tilt sensor configured to measure the tilt angle of the vehicle relative to the first reference direction.

4. The LIDAR system of claim 3, wherein the tilt sensor is an inclinometer and the first reference direction is a gravity direction.

5. The LIDAR system of claim 2, further comprising:
at least one processor configured to receive LIDAR data based on the electrical signals from the plurality of photodetectors, generate topography information based on the LIDAR data, and determine the surface angle of the anticipated driving surface relative to the second reference direction based on the topography information.

6. The LIDAR system of claim 2, further comprising:
a memory configured to store topography information; and at least one processor configured to receive the topography information and location information of the vehicle, and determine the surface angle of the anticipated driving surface relative to the second reference direction based on the topography information and the location information of the vehicle.

7. The LIDAR system of claim 6, wherein topography information includes a topography map downloaded to the memory from a source external to the LIDAR system.

8. The LIDAR system of claim 1, wherein:
each processing channel corresponds to one of the plurality of vertical regions of the field of view, and
the controller is configured to activate a first portion of the plurality of processing channels that correspond to the portion of the plurality of vertical regions and deactivate a second portion of the plurality of processing channels that do not correspond to the portion of the plurality of vertical regions, and
the controller is configured to dynamically change the first portion of the plurality of processing channels and the second portion of the plurality of processing channels as the portion of the plurality of vertical regions that correspond to the region of interest changes.

9. A Light Detection and Ranging (LIDAR) system, comprising:
a LIDAR transmitter configured to scan a field of view with a plurality of laser beams that are combined to form each of a plurality of scanning laser beams,
wherein the LIDAR transmitter is configured to transmit the plurality of scanning laser beams into a region of interest of the field of view, wherein the field of view is defined by a first vertical dimension and a first horizontal dimension, wherein the field of view comprises a plurality of vertical regions arranged to define the first vertical dimension, wherein the region of interest is defined by a second vertical dimension, a second horizontal dimension, and a center of projection provided at a center of the second vertical dimension and the second horizontal, wherein the second vertical dimension is smaller than the first vertical dimension, wherein the region of interest comprises a portion of the plurality of vertical regions that defines the second vertical dimension, and wherein each scanning laser beam of the plurality of scanning laser beams has a vertical length that extends vertically in the field of view and is equal to the second vertical dimension,
the LIDAR transmitter comprising:
a laser array comprising a plurality of laser sources each configured to transmit a different one of a plurality of laser beams such that each of the plurality of laser beams is projected from the LIDAR transmitter into a different vertical region of the portion of the plurality of vertical regions;
a controller configured to receive feedback information and modify the center of projection of the region of interest in a vertical direction based on the feedback information such that a vertical position of the center of projection is shifted vertically within the first vertical dimension of the field of view and the portion of the plurality of vertical regions that corresponds to the region of interest changes; and
a LIDAR receiver comprising a photodetector array configured to receive a reflected light beam and generate electrical signals based on the reflected light beam, wherein the LIDAR receiver further comprises:
a plurality of detector channels coupled to the photodetector array for receiving the electrical signals, wherein each detector channel of the plurality of detector channels corresponds to one of the plurality of vertical regions of the field of view;
a signal processing chain configured to process the electrical signals received from the plurality of detector channels, the signal processing chain comprising a plurality of processing channels that each include at least one signal processing component; and
a readout circuit coupled to and between the plurality of detector channels and the plurality of processing channels,
wherein, based on the vertical position of the center of projection, the readout circuit is configured to selectively couple a first subset of detector channels of the plurality of detector channels that correspond to the portion of the plurality of vertical regions to the plurality of processing channels and selectively decouple a second subset of detector channels of the plurality of detector channels that do not correspond to the portion of the plurality of vertical regions, and
wherein the controller is configured to dynamically change the first subset of detector channels and the second subset of detector channels as the portion of the plurality of vertical regions that correspond to the region of interest changes.

10. The LIDAR system of claim 9, wherein:
the region of interest represents an active scanning area in which the plurality of scanning laser beams are scanned, and
the controller is configured to modify the region of interest within the field of view in the vertical direction by shifting the active scanning area in the vertical direction.

11. The LIDAR system of claim 9, wherein:
the LIDAR transmitter further comprises:
a one-dimensional microelectromechanical systems (MEMS) oscillating structure configured to oscillate about a single scanning axis and reflectively transmit the plurality of laser beams such that the plurality of scanning laser beams move horizontally across the second horizontal dimension of the region of interest in a horizontal scanning direction as the one-dimensional MEMS oscillating structure oscillates about the single scanning axis, and
the LIDAR system further comprises:
an actuator configured to rotate the one-dimensional MEMS oscillating structure about a tilt axis, wherein an orientation of the one-dimensional MEMS oscillating structure about the tilt axis defines a vertical position of the center of projection, and
wherein the controller is configured to modify the center of projection of the region of interest in the vertical direction by modifying the orientation of the one-dimensional EMS oscillating structure about the tilt axis.

12. The LIDAR system of claim 11, further comprising:
a tilt sensor configured to measure a tilt angle of a vehicle relative to a reference direction, and the feedback information includes the tilt angle of the vehicle, and the controller is configured to:
modify the orientation of the one-dimensional MEMS oscillating structure about the tilt axis to shift the center of projection towards a lower vertical region on a condition that the tilt angle corresponds to an incline angle that exceeds a first threshold,
modify the orientation of the one-dimensional MEMS oscillating structure about the tilt axis to shift the center of projection towards an upper vertical region on a condition that the tilt angle corresponds to a decline angle that exceeds a second threshold, and
modify the orientation of the one-dimensional MEMS oscillating structure about the tilt axis to shift the center of projection towards a center vertical region on a condition that the tilt angle is between the first threshold and the second threshold.

13. The LIDAR system of claim 11, wherein:
the feedback information includes a surface angle of an anticipated driving surface relative to a reference direction, and
the controller is configured to:
modify the orientation of the one-dimensional MEMS oscillating structure about the tilt axis to shift the center of projection towards a lower vertical region on a condition that the surface angle corresponds to an incline angle that exceeds a first threshold,
modify the orientation of the one-dimensional MEMS oscillating structure about the tilt axis to shift the center of projection towards an upper vertical region on a condition that the surface angle corresponds to a decline angle that exceeds a second threshold, and
modify the orientation of the one-dimensional MEMS oscillating structure about the tilt axis to shift the center of projection towards a center vertical region on a condition that the surface angle is between the first threshold and the second threshold.

14. The LIDAR system of claim 11, wherein the controller is configured to rotate the one-dimensional MEMS oscillating structure about the tilt axis dynamically between a range of tilt angles based on the feedback information.

15. The LIDAR system of claim 11, wherein an entire area of the region of interest defined by the second vertical dimension and the second horizontal dimension is shifted according to the orientation of the one-dimensional MEMS oscillating structure about the tilt axis.

16. The LIDAR system of claim 9, wherein:
the LIDAR transmitter further comprises:
a one-dimensional microelectromechanical systems (MEMS) oscillating structure configured to oscillate about a single scanning axis and reflectively transmit the plurality of laser beams such that the plurality of scanning laser beams move horizontally across the second horizontal dimension of the region of interest in a horizontal scanning direction as the one-dimensional MEMS oscillating structure oscillates about the single scanning axis, each of the plurality of scanning laser beams includes a plurality of vertical segments, each corresponding to a different vertical region of the portion of the plurality of vertical regions, each of the plurality of laser sources contributes to a different vertical segment of the portion of the plurality of vertical segments of each of the plurality of scanning laser beams, and the controller is configured to modify the center of projection of the region of interest in the vertical direction by activating a first portion of the plurality of laser sources and deactivating a second portion of the plurality of laser sources based on the feedback information in order to shorten a length of a vertical scanning line in the vertical direction.

17. The LIDAR system of claim 9, further comprising:
an actuator configured to rotate the LIDAR transmitter about a tilt axis, wherein an orientation of the LIDAR transmitter about the tilt axis defines the vertical position of the center of projection, and wherein the controller is configured modify the center of projection of the region of interest in the vertical direction by modifying the orientation of the LIDAR transmitter about the tilt axis to shift the center of projection of the region of interest in the vertical direction.

18. The LIDAR system of claim 9, wherein:
the controller is configured to modify the center of projection of the region of interest in the vertical direction by activating a first portion of the plurality of laser sources and deactivating a second portion of the plurality of laser sources based on the feedback information such that the portion of the plurality of vertical regions varies dynamically according to the feedback information.

19. The LIDAR system of claim 16, further comprising:
a tilt sensor configured to measure a tilt angle of a vehicle relative to a reference direction, and the feedback information includes the tilt angle of the vehicle, wherein the plurality of vertical regions includes a lower region, a center region, and an upper region that are activated as the portion of the plurality of vertical regions or deactivated as outside the portion of the plurality of vertical regions according to corresponding ones of the plurality of laser sources, and the controller is configured to:
activate at least the lower region and deactivate the upper region on a condition that the tilt angle corresponds to an incline angle that exceeds a first threshold, activate at least the upper region and deactivate the lower region on a condition that the tilt angle corresponds to decline angle that exceeds a second threshold, and activate at least the center region and deactivate at least part of the lower region and at least part of the upper region on a condition that the tilt angle is between the first threshold and the second threshold.

20. The LIDAR system of claim 18, wherein:
the feedback information includes a surface angle of an anticipated driving surface relative to a reference direction, wherein the plurality of vertical regions includes a lower region, a center region, and an upper region that are activated as the portion of the plurality of vertical regions and deactivated as outside of the portion of the plurality of vertical regions according to corresponding ones of the plurality of laser sources, and the controller is configured to:
activate at least the lower region and deactivate the upper region on a condition that the surface angle corresponds to an incline angle that exceeds a first threshold, activate at least the upper region and deactivate the lower region on a condition that the surface angle corresponds to decline angle that exceeds a second threshold, and activate at least the center region and deactivate at least part of the lower region and at least part of the upper region on a condition that the surface angle is between the first threshold and the second threshold.

21. The LIDAR system of claim 9, further comprising:
a tilt sensor configured to measure a tilt angle of a vehicle relative to a reference direction, and the feedback information includes the tilt angle of the vehicle.

22. The LIDAR system of claim 9, further comprising:
a memory configured to store topography information,
wherein the feedback information includes a surface angle of an anticipated driving surface relative to a reference direction, and the controller is configured to determine the surface angle of the anticipated driving surface based on the topography information.

23. The LIDAR system of claim 22, further comprising:
at least one processor configured to receive LIDAR data based on the electrical signals from the photodetector array and generate the topography information based on the LIDAR data.

24. The LIDAR system of claim 9, wherein:
each of the plurality of laser sources has a variable pulse repetition rate, and the controller is configured to modify the center of projection of the region of interest in the vertical direction by decreasing the pulse repetition rate of a first portion of the plurality of laser sources relative to the variable pulse repetition rate of a second portion of the plurality of laser sources based on the feedback information in order to shorten a scanning area in the vertical direction during at least a portion of a scanning period.

* * * * *